Patented Dec. 19, 1933

1,939,736

UNITED STATES PATENT OFFICE 1,939,736

PRODUCTION OF ACETIC ACID AND GLUCOSE

Philippe A. Tetrault, West Lafayette, Ind., assignor to The Wisconsin Alumni Research Foundation, Madison, Wis., a corporation of Wisconsin No Drawing. Application November 27, 1929
Serial No. 410,265

5 Claims. (Cl. 260—120)

The present invention relates to the production of acetic acid and glucose by fermentation processes, and has for its object to obtain large yields of these compounds by the fermentation of cellulose and cellulosic materials with or without the admixture of nitrogenous materials.

The production of acetic acid by microorganisms as now carried out is effected by means of bacteria belonging to the genus Acetobacter, e. g., Acetobacter aceti, acting upon alcohol under strictly aerobic conditions or by means of bacteria of the heat resisting type acting upon starchy materials under strictly anaerobic conditions in closed vessels.

I have found that by the isolation of cultures of certain thermophilic bacteria, which are iden ified by the fact that they will convert the greater part of the cellulose or cellulosic materials into volatile acids, e. g., acetic acid and reducing sugars, e. g., glucose, and will not ferment sugars as such, e. g., glucose, levulose, maltose, etc., with the production of gas, a culture of such potency may be obtained that it can be used for the purpose of obtaining large yields of volatile acids, e. g., acetic acid and reducing sugars, e. g., glucose by the fermentation of solutions or suspensions of natural substances rich in cellulose or with or without added nitrogenous material, under aerobic or anaerobic conditions, i. e., with free access of air as in yeast fermentation or without the free entrance of air.

My invention consists in the method employed in the isolation of such cultures and in the fermentation of solutions or suspensions of natural substances rich in cellulose or of nitrogenous materials mixed with such substances by means of the aforesaid isolated cultures of thermophilic microorganisms, under aerobic or anaerobic conditions, substantially as hereinafter indicated, with the production of large yields of acetic acid and glucose.

The microorganisms in question are found in soil and manures, e. g., horse, goat, sheep, bison, llama, cattle, etc.

A convenient method of obtaining the microorganisms is as follows: I prepare a number (say 100) of cultures in the usual way by inoculating e. g., hot (say 90° C. to 100° C.) dilute, (say 2%) sterile cellulose mash to which has been added nitrogenous matter, inorganic and organic, e. g., sodium ammonium phosphate (Na(NH$_4$)$_2$HPO$_4$) peptone, tankage and other nutritive salts e. g., calcium chloride, potassium phosphate and magnesium sulphate, with soil or manure and then allowing it to ferment at about 55° C. to 65° C. for about four or five days.

From these tubes I select those which show the most vigorous fermentation of the cellulose. These selected tubes I now heat up to from 90° C. to 100° C. for a period of five to ten minutes. Many of the microorganisms are destroyed but the desired resistant forms remain. I next inoculate a sterile cellulose mash with the culture which has been heated as aforesaid, and so obtain a subculture. I now incubate this subculture at about 55° C. to 65° C. for a period of four or five days. I then heat this subculture up to 90° C. to 100° C. for five to ten minutes, and use it to inoculate another sterilized cellulose medium and repeat the foregoing subculturing operation a number of times, say 100 to 150 times. In these operations no special precautions need be taken for the exclusion of air. I next inoculate sterile cellulose medium to which has been added between 0.6% and 1.2% washed agar and make dilutions in the usual way. These dilutions are made in a special chamber which prevents the evaporation of the culture. The chamber is prepared as follows:

Two Petri dish halves of equal diameters are selected. These are sterilized and fitted together so as to form a chamber. After pouring the diluted culture into the chamber and allowing the agar to solidify, the chamber is inverted and the two dishes making the chamber are sealed together by means of heavy gummed paper tape. The chamber is now air tight but not anaerobic. The chambers are incubated at 55° C. to 65° C. for a period up to sixty days. Some time during this period areas of digested cellulose will appear in the agar. Such areas are picked from the highest dilution showing cellulose decomposition and new dilutions are made in other sterile chambers as heretofore described. After a number of subculturings in this type of chamber a digested area is picked therefrom and inoculated into sterile cellulose medium.

The isolated culture so obtained can then be used in the production of volatile acids, e. g., acetic acid and reducing sugars, e. g., glucose under aerobic or anaerobic conditions by inoculating with the final culture a cooled solution or suspension of the selected substratum, e. g., cellulose, corn cobs, sawdust, corn stover, cotton seed hulls, and other equivalent plant materials to which calcium carbonate (CaCO$_3$) has been added in excess, and which has been previously sterilized for four hours at a temperature of 120° C. to 140° C. and a pressure of 15 to 20 lbs.

A fermentation starts in about 24 hours and proceeds vigorously for four to five days. The fermentation is completed in about eight to ten days. The mash is then distilled in the usual way and acetic acid is obtained in the distillate. The glucose remains in the mash.

I have found that the slop of the acetone-butyl alcohol fermentation which in the past has been a waste product can be employed to great advantage as a nitrogenous nutrient in the fermentation of cellulose, corn cobs and similar substances for the production of acetic acid and glucose.

I can carry the fermentation into effect under anaerobic conditions in the following manner: The cooled sterilized mash is run into closed tanks in which it can be contained under anaerobic conditions at about 55° C. to 65° C. It is then inoculated with the hereinbefore described final culture, and allowed to ferment. When the fermentation is completed, the mash is distilled and the products are isolated as before.

Having now described my invention, what I claim as new and desire to secure by Letters Patent is:

1. The method of producing acetic acid and glucose which consists in inoculating samples of sterile cellulose mash containing nitrogenous matter at a temperature approximately 90° C. to approximately 100° C. with materials containing the thermophilic microorganisms naturally developed in soil and manure and promoting fermentation thereof under heat of from approximately 55° C. to approximately 65° C. selecting from the samples thus treated a sample which shows vigorous fermentation, heating the selected sample to a temperature of from approximately 90° C. to approximately 100° C. to destroy the less resistant microorganisms and to reduce the number to the more heat resistant forms, inoculating sterile cellulose mash therewith and obtaining a sub-culture, heating the sub-culture to destroy the less resistant microorganisms and to reduce the number to the more resistant forms and repeating said process of elimination until a culture of thermophilic bacteria of the desired potency is obtained, inoculating sterile cellulose to which agar has been added with a culture of the character last mentioned and making dilutions of the same, incubating the same at a temperature from approximately 55° C. to approximately 65° C. until areas of digested cellulose appear in the agar, inoculating sterile cellulose medium with digested cellulose obtained as above and allowing the same to ferment vigorously until completion, subjecting the same to a distillation process, and obtaining acetic acid from the distillate, and glucose from the residue.

2. The process of producing acetic acid and glucose by the fermentation of cellulosic material, which process comprises inoculating culture media of dilute sterile cellulose mash containing nutritive salts at a temperature approximating 90° to 100° C. with materials containing the characteristic thermophilic microorganisms naturally developed in soil and manure; incubating said cultures so obtained at a temperature approximating 55° to 65° C. for a period of about five days; heating at a temperature between 90° C. to 100° C. for upwards of ten minutes, the cultures which show vigorous fermentation in order to destroy the less-resistant microorganisms; inoculating sterile cellulose mash heated to 90° to 100° C. with the remaining resistant microorganisms to obtain sub-cultures; incubating and heating said sub-cultures as before; repeating the inoculation, incubation and heating of sub-cultures of surviving micro-organisms to obtain vigorous microorganisms of the character desired; inoculating sterile cellulose dilutions to which agar has been added with such microorganisms and incubating the same at a temperature from approximately 55° C. to approximately 65° C. for a period up to sixty days to produce areas of digested cellulose; and using the microorganisms in said digested cellulose to ferment cellulosic material.

3. The process of producing acetic acid and glucose by the fermentation of cellulosic material which process comprises inoculating culture media of dilute, sterile cellulose mash containing nutritive salts at a temperature approximating 90° C. to 100° C. with materials containing the characteristic thermophilic microorganisms naturally developed in soil and manure; incubating said cultures so obtained at a temperature approximating 55° to 65° C.; heating the cultures which show vigorous fermentation to destroy the less resistant microorganisms; inoculating sterile cellulose mash with the remaining microorganisms to obtain sub-cultures; incubating and heating said sub-cultures as before; repeating the incubation and heating of sub-cultures of surviving microorganisms to obtain vigorous microorganisms of the character desired; inoculating sterile cellulose dilutions to which agar has been added with such microorganisms, and incubating the same until areas of digested cellulose appear; using the microorganisms in said digested cellulose to ferment cellulosic material.

4. The process of producing acetic acid and glucose by the fermentation of cellulosic material which comprises inoculating culture media of sterile, dilute cellulose matter with the characteristic thermophilic microorganisms found in soil and manure; selecting the most vigorous cultures after incubation; destroying the less resistant microorganisms in the selected cultures by heating at from 90° C. to 100° C. for several minutes; repeating preparation, incubation, selection and heating of sub-cultures of surviving microorganisms of previous cultures; inoculating sterile dilutions of cellulose and agar with the microorganisms so obtained; incubating such dilutions to produce areas of digested cellulose; and inoculating and fermenting cellulosic material with the microorganisms in said digested cellulose to produce acetic acid and glucose.

5. The process of producing acetic acid and glucose by the fermentation of cellulosic material which comprises inoculating culture media of cellulose matter with the thermophilic microorganisms found in soil and manure; selecting the most vigorous cultures after incubation; heating the selected cultures at such temperature and for such length of time as will destroy the less resistant microorganisms; repeating preparation, incubation, selection and heating of sub-cultures of the surviving microorganisms of previous cultures; inoculating dilutions of cellulose and agar with the microorganisms so obtained; incubating such dilutions to produce areas of digested cellulose; and fermenting cellulosic material with the microorganisms in or adjacent to the said areas of digested cellulose to produce acetic acid and glucose.

PHILIPPE A. TETRAULT.